No. 683,704. Patented Oct. 1, 1901.
H. PARTRIDGE.
MOTOR VEHICLE.
(Application filed Jan. 9, 1901.)
(No Model.) 2 Sheets—Sheet 1.
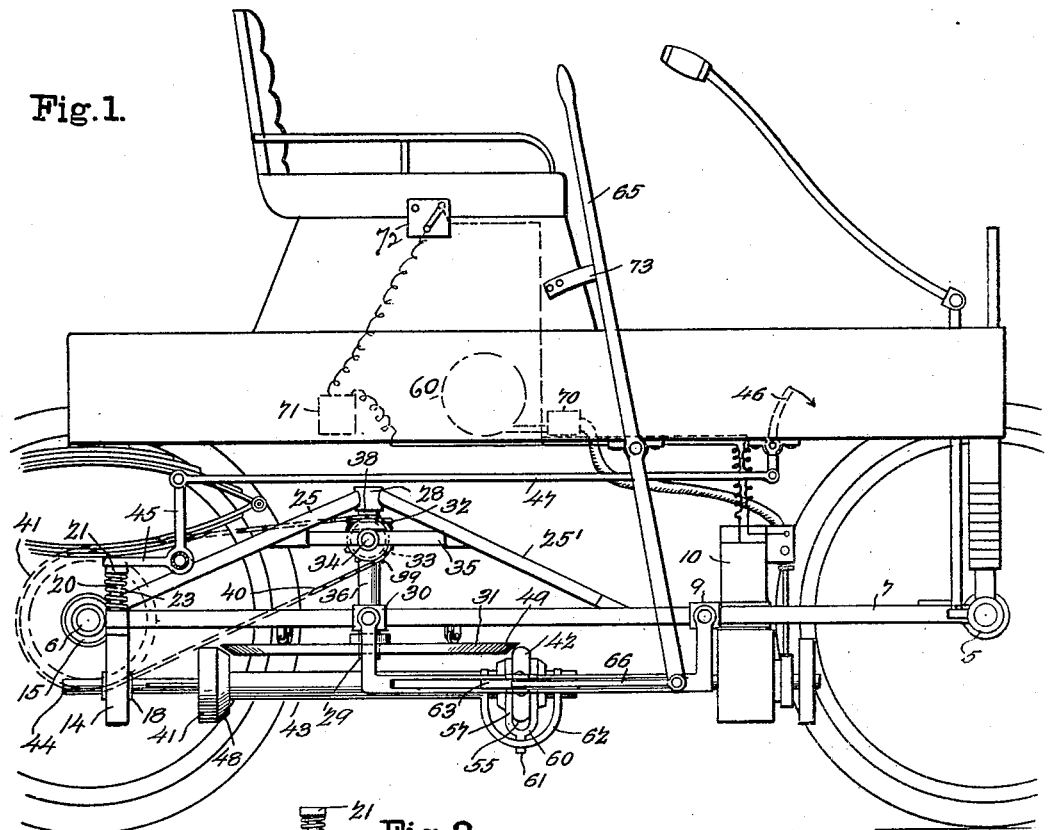
Fig. 1.
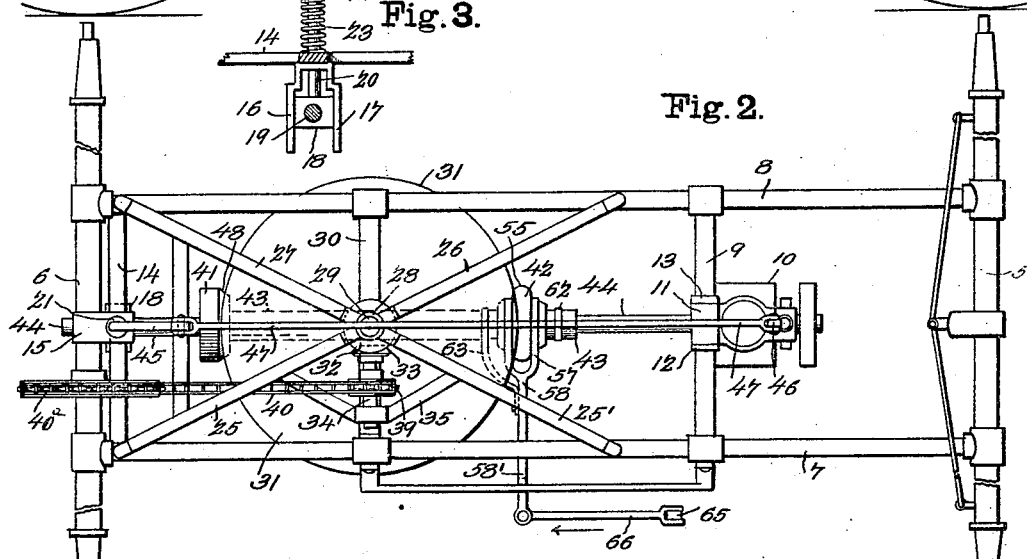
Fig. 3.
Fig. 2.
Witnesses
H. PARTRIDGE, Inventor
by C. A. Snow & Co.
Attorneys No. 683,704. Patented Oct. 1, 1901.
H. PARTRIDGE.
MOTOR VEHICLE.
(Application filed Jan. 9, 1901.)
(No Model.) 2 Sheets—Sheet 2.
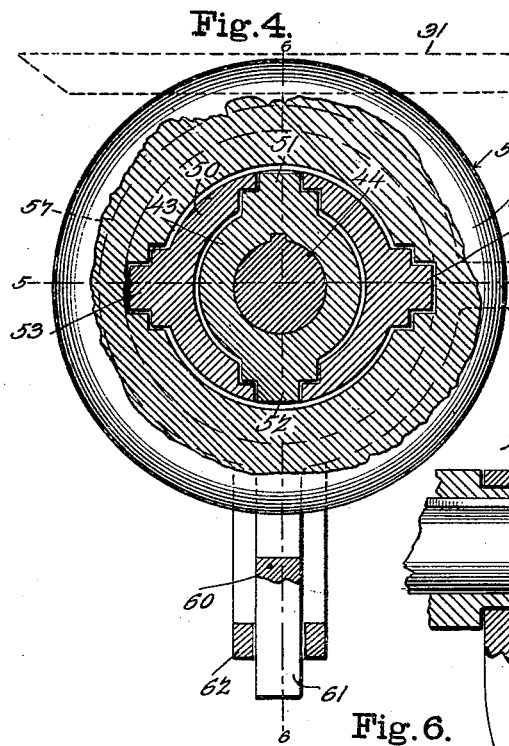
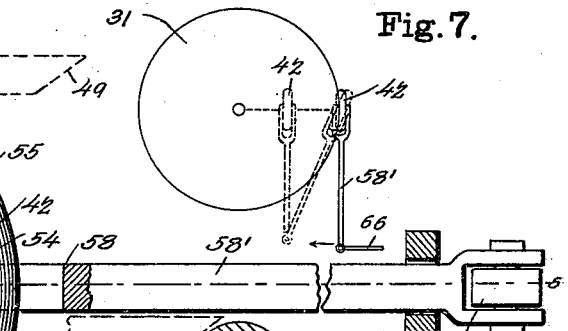
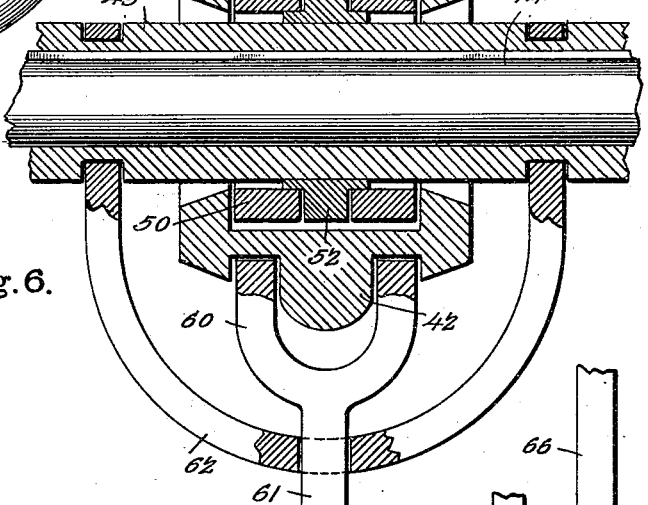
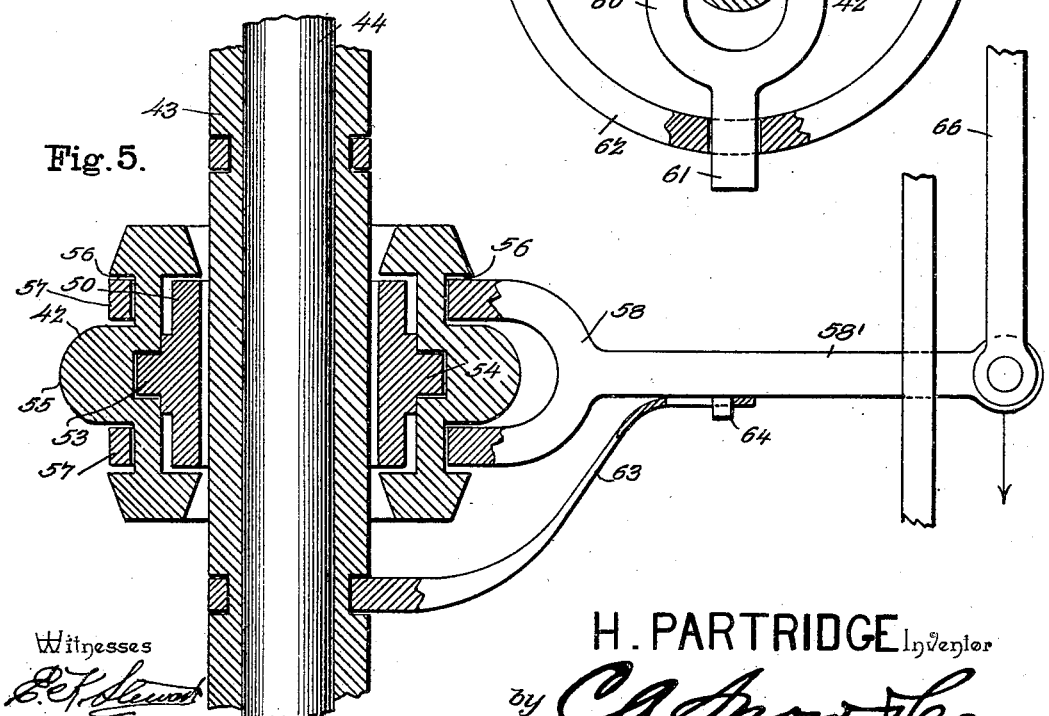
H. PARTRIDGE, Inventor
by C. A. Snow & Co.
Attorneys

UNITED STATES PATENT OFFICE.

HUGH PARTRIDGE, OF JACKSONVILLE, FLORIDA, ASSIGNOR OF ONE-HALF TO ISAAC L. HARRIS, OF SAME PLACE.

MOTOR-VEHICLE.

SPECIFICATION forming part of Letters Patent No. 683,704, dated October 1, 1901.

Application filed January 9, 1901. Serial No. 42,680. (No model.)

*To all whom it may concern:*

Be it known that I, HUGH PARTRIDGE, a citizen of the United States, residing at Jacksonville, in the county of Duval and State of Florida, have invented a new and useful Motor-Vehicle, of which the following is a specification.

This invention relates to automobiles in general, and it has specific reference to the driving mechanism therefor, the object of the invention being to provide a simple and effective construction and arrangement of the motor and intermediate mechanism for delivering power to the drive-axle of the vehicle, a further object of the invention being to provide a construction wherein the speed of the vehicle may be accurately graduated, while the direction of movement thereof may be readily reversed, further objects and advantages being evident from the following description.

In the drawings forming a portion of this specification, and in which like numerals of reference indicate similar parts in the several views, Figure 1 is a side elevation of the vehicle, one of the side bars of the running-gear being broken away and the wheels at one side being removed and the axles shown in section. Fig. 2 is a plan view showing the running-gear with the wheels and body removed. Fig. 3 is a section taken vertically and transversely through the drive-shaft and showing the slidable mounting of the cross-head carrying the rear bearing of the drive-shaft or motor-shaft. Fig. 4 is an end elevation of the forward driving friction-wheel, the relative position of the friction-disk being indicated in dotted lines. Fig. 5 is a section on line 5 5 of Fig. 4. Fig. 6 is a section on line 6 6 of Fig. 4. Fig. 7 is a diagram showing the normal and shifted positions of the forward drive-wheel on the friction-disk.

Referring now to the drawings, the running-gear of the present vehicle comprises a forward axle 5 and a rear or drive axle 6, connected by parallel side bars or reaches 7 and 8, which latter are preferably of tubular construction, and connecting these reaches near their forward ends is a cross-brace 9, from which is suspended the motor, which in the present instance is a gas-engine 10. The motor is connected with the brace 9 by means of a sleeve 11, which is attached to or formed upon the engine and is slipped loosely onto the brace for pivotal movement. This sleeve 11 lies between flanges 12 and 13, formed upon or secured to the brace and which prevent displacement of the sleeve longitudinally. Connecting the reaches just in advance of the rear axle is a cross-brace 14, which is sustained midway of its ends by a bracket 15 in the form of a collar encircling the rear shaft. Depending from the under side of the brace 14 is a guide-frame comprising spaced arms 16 and 17, the lower portions of which arms are spaced farther apart than the upper portions, and between these lower portions of the arms is slidably mounted a cross-head 18, having a bearing 19, in which the rear end of the motor-shaft is received. A stem 20 in the form of a rod extends upwardly from the cross-head and through the cross-brace 14, and at the upper end thereof is a head 21. Upon the rod, between the head thereof and the cross-brace, there is disposed a helical spring 23, which acts to sustain the rod, and therewith the motor-shaft, yieldably in raised position.

Connected with the reaches of the running-gear and converging upwardly to meet at a common point are four supporting-legs 25, 25', 26, and 27, said legs being directly connected at their upper ends to a socket-piece 28, which forms a bearing for the upper end of a vertically-disposed shaft 29, having also a bearing in a cross-brace 30, connected to the reaches. On the lower end of this shaft there is fixed a driven friction-disk 31. The shaft 29 carries a bevel-gear 32, meshing with a similar gear 33 on a counter-shaft 34, one end of which is mounted in a bearing in a cross-piece 35, connecting two of the supporting-legs 25 and 25', while its opposite end is mounted in a bearing in a sleeve 36, mounted upon the shaft 29 below the bevel-gear thereon, and which sleeve prevents downward movement of the shaft 29. A second sleeve 38 above the beveled gear prevents displacement of the shaft. The shaft 34 carries a sprocket 39, with which is engaged a drive-chain 40, engaged also with a second sprocket 40ª upon the rear axle.

With the above construction it will be seen that if the friction-disk 31 is rotated in one direction the vehicle will be propelled forwardly and that if said disk is rotated in an opposite direction the vehicle will move in an opposite direction. To thus oppositely rotate the disk 31, friction drive-wheels 41 and 42 are provided, these drive-wheels being carried by a sleeve 43, which is slidably mounted upon the shaft 44 for longitudinal movement and is splined thereto to be rotated thereby. The shaft 44 passes diametrically of and below the disk 31 and at its forward end is attached to the shaft of the motor 10 or forms the motor-shaft, as preferred. Thus if either of the friction-wheels be in engagement with the friction-disk 31 they may be moved instantly from such engagement by depressing the rear end of the shaft. This construction is provided for use in cases of emergency when there is not time to slide the sleeve 43 and carry either wheel radially of the disk from engagement therewith, and to depress the rear end of the motor-shaft a rock-lever 45 is pivoted upon the frame of the running-gear and has one end disposed upon the head 21 of stem 20, while the opposite end thereof is connected with a foot-lever 46 through the medium of a connecting-rod 47. This foot-lever, as illustrated, is projected above the floor of the body of the vehicle, so that it may be readily operated by the foot of the occupant of the vehicle.

The rear driving-wheel 41 has a beveled edge 48, which when the sleeve 43 is slid forwardly upon the drive-shaft engages the beveled edge 49 of the disk 31, and when the sleeve is slid rearwardly said driving friction-wheel is moved from the disk, the direction of rotation of the sleeve, and therewith the wheel 41, being such that when the wheel is engaged with the friction-disk the vehicle will be driven rearwardly.

The driving friction-wheel 42 is spaced from the wheel 41 a distance somewhat greater than the diameter of the friction-disk, so that both wheels may lie out of engagement with the friction-disk, and while the wheel 41 is intended for engagement only with the beveled edge of the disk 31 the wheel 42 is adapted to be shifted radially of the disk to transmit motion thereto at different speeds, depending upon the distance of said drive-wheel from the center of the disk.

Instead of sliding the wheel 42 laterally over the face of disk 31 said wheel is moved pivotally in a horizontal plane, so that its axis instead of intersecting the continuation of the axis of the disk 31 will pass to one side thereof, and the wheel being rotated it will describe a spiral path in the direction of the center of the disk. To move the wheel outwardly over the face of the disk, it is moved pivotally in the same plane for its axis to lie at the opposite side of the axis of the disk 31, when it will describe a spiral path to the periphery of the disk. The shifted position of the wheel is illustrated in the diagram in Fig. 7. When the wheel is shifted from its normal position, which is at right angles to the sleeve 43, it lies at an acute angle thereto, and rotation of the sleeve would under ordinary conditions give a wabbling movement to the wheel. To prevent this wabbling motion of the wheel, two sets of trunnions are provided, as follows: The sleeve 43 is provided with alining trunnions 51 and 52, lying at diametrically opposite sides of the sleeve, and on these trunnions is mounted a collar 50, which is adapted for movement thereon in a horizontal plane, and this collar 50 is in turn provided with trunnions 53 and 54 at diametrically opposite points, the common axis of which trunnions lies at right angles to and intersects the common axis of the trunnions 51 and 52. On the trunnions 53 and 54 is mounted the friction-wheel 42, so that said wheel may be rotated from the sleeve 43 while inclined thereto and without wabbling.

The friction-wheel 42 has a curved engaging flange or face 55, that makes contact with the friction-disk 31, and at opposite sides thereof are peripheral grooves 56, in which are engaged straps 57 at the ends of the arms of a yoke 58, having a stem 58', and through the medium of which yoke the friction-wheel is manipulated, and therewith the sleeve 43. From the ends of the arms of the yoke 58 there depends a second yoke 60, having a stem 61, which pivotally engages a bearing in a hanger or bracket 62, depending from the sleeve 43. This bracket permits of pivotal movement of the yoke 60 and corresponding movement of the wheel 42 in a horizontal plane, while preventing movement of the wheel in any other plane.

A leaf-spring 63 is mounted upon the sleeve 43, and the outer end thereof is slidably engaged with the stem 58' through the medium of a keeper 64. This spring holds the yoke-stem 58' normally and yieldably at right angles to the sleeve 43, so that the axis of wheel 42 intersects the axis of the disk 31.

To shift the sleeve 43 to carry either wheel 41 or 42 into engagement with the disk 31, a hand-lever 65 is provided and is pivoted to the body of the vehicle, the lower end of this lever being connected with the outer end of the stem 58' through the medium of a connecting-rod 66. When the hand-lever is moved in one direction, the sleeve is moved rearwardly and the wheel 42 strikes the beveled edge of the disk 31. Further movement of the lever carries the outer end of the stem 58' rearwardly against the tendency of spring 63, and as the contact of the wheel with the disk retards the movement of the wheel said wheel is moved pivotally, as shown in the diagram in Fig. 7. The wheel 42 then rolls onto the friction-disk and describes a spiral path in the direction of the center of the friction-disk until it has reached a point which brings the yoke-stem again at right angles to the sleeve, at which time the wheel 42 will again lie with its axis intersecting the axis of the disk 31 and progress of the wheel 42 will cease. If the hand-lever be then moved in the opposite direction, the wheel 42 will be pivotally moved to so position it that when rotated it will describe a spiral path in the direction of the periphery of the disk 31 and may run off from the disk or stop at an intermediate point, depending upon the extent of movement of the lever. Further movement of the lever in the last-named direction brings the wheel 41 into engagement with the disk 31, as will be understood.

When the wheel 42 moves onto the disk 31, the motor-shaft is of course depressed, the tension of the supporting-spring at the outer end thereof being sufficient to hold the wheel against the disk with that friction which will insure rotation of the disk by the wheel.

As above mentioned, the motor in the present instance is a gas-engine and is of the explosive type. Fuel is fed from a mixing-chamber 70 through a pipe to the ignition-chamber of the engine, where it is ignited by an electric spark in the usual manner. The current for operating the igniter is drawn from a battery 71 and is turned off and on by a switch 72, and the fuel is carried in a tank 60, from which it is fed to the mixing-chamber.

The hand-lever for throwing the friction-gearing is held normally with both wheels from engagement with the disk 31 by means of a spring-catch 73, from which the lever may be disengaged by a pivotal movement and without necessitating lateral pressure, as is the case when a rack is used.

The rear traction-wheels of the vehicle are fixed to the axle, while the front wheels may have any desired steering mechanism.

With proper movement of the shifting-lever it will be understood that the rear friction-wheel may be moved over the face of the friction-disk to vary the speed of backward movement of the vehicle and, furthermore, that instead of the specific style of rear friction-wheel shown a wheel constructed like the front friction-wheel may be used and connected in the same manner with the shifting-lever. It will be noted that the shoulders in the legs 16 and 17 of the guide or cross head 18 limit the upward movement of the latter and prevent contact of the sleeve 43 with the disk when the driving-wheels are disengaged from the disk.

What is claimed is—

1. In a motor-vehicle the combination with a driven shaft having a friction-disk having friction-faces lying at an angle to each other, of a pivoted motor-shaft having a friction-wheel slidably mounted thereon for movement from one face to the other of the friction-disk, and means for holding the shaft yieldably against pivotal movement with the friction-wheel in contact with the disk.

2. The combination with a friction-disk having friction-faces lying at an angle to each other, of a drive-shaft having a friction-wheel mounted thereon and means to slide said friction-wheel from one face to the other without moving said friction-wheel from contact with the disk, substantially as described.

3. The combination with a friction-disk having friction-faces lying at an angle to each other, of a drive-shaft having a friction-wheel thereon, means to slide said friction-wheel from one face to the other of the disk without disengaging said wheel from the disk, said shaft being movable toward and from the disk to carry the wheel bodily into and out of engagement with the disk and having means for holding it yieldably against movement from the disk to hold the wheel yieldably in contact with the disk, substantially as described.

4. The combination with a driven member, of a pivoted motor having a drive-shaft and a driving member mounted slidably on the shaft for movement radially of the driven member and in contact therewith, said driving member being bodily movable with the motor and its shaft into and out of contact with the driven member.

5. The combination with a driven rotatable member, of a pivoted motor having its shaft disposed to intersect the axis of the driven member, said motor being movable with its shaft in the common plane with said axis, and a driving-wheel mounted slidably on the shaft for adjustment radially of the driven member and movable bodily with the shaft into and out of contact with the driven member.

6. The combination with a driven member of a drive-shaft and a driving-wheel for engagement with the driven member, said wheel being mounted slidably on the shaft adapted for pivotal movement to lie with its axis alternately intersecting and lying outside of the axis of the driven member, and means for holding the driving-wheel yieldably against pivotal movement.

7. The combination with a driven member, of a drive-shaft, a drive-wheel mounted slidably on the shaft and adapted for movement into and out of engagement with the driven member, said drive-wheel being pivotally mounted upon the driven shaft for movement in a plane at right angles to the axis of the driven member, and means for holding the driving-wheel yieldably against pivotal movement.

8. The combination with a driven friction member, of a drive-shaft adapted for movement toward and from the driven member, a sleeve revoluble with and longitudinally movable on said drive-shaft, a driving-wheel mounted on said sleeve for universal axial movement, and a second drive-wheel on said sleeve, for engagement with said driven member when the first-named drive-wheel is out of engagement therewith, substantially as described.

9. The combination with a driven member, of spaced driving members mutually connected and disposed for interchangeable contact with the driven member at opposite sides of the center thereof, means for rotating the driving members and means for shifting them to engage the periphery of the driven member alternately and to pass therefrom over the face of the driven member, toward and from the center thereof, substantially as described.

10. The combination with a driven member, having separate friction-faces, of spaced driving members mutually connected and disposed for interchangeable contact with a face of the driven member at opposite sides of its center, and for movement therefrom to a second face, without disengaging the driven member, means for rotating the driving members and means for shifting them to alternately engage the periphery of said driven member and to pass therefrom over the face thereof, substantially as described.

11. The combination with a driven friction-disk having a beveled edge for frictional contact, and a friction-face, of a driven friction-wheel, means to shift the same laterally over the beveled edge and onto the face of the wheel and toward and from the center thereof, and means for maintaining contact of the wheel with the disk, while said wheel is being shifted, substantially as described.

12. The combination with a driven friction-disk having a friction-face and a beveled friction edge leading thereto, of a pivoted motor having a shaft, a friction-wheel mounted slidably upon the shaft for movement over the friction edge and onto the friction-face, and means for holding the motor yieldably against pivotal movement to maintain contact of the wheel with the disk during its shifting movement.

13. In a motor-vehicle, the combination with a driven shaft having a friction-disk having friction-faces lying at an angle to each other, of a driving-shaft having a laterally-movable friction-wheel and means to engage said friction-wheel with either of the faces of the disk at will and to shift said friction-wheel toward and from the center of said disk to drive the latter at different speeds, substantially as described.

14. The combination with a friction-disk having a beveled edge and a friction-face, of a second friction-wheel mounted for lateral movement over the beveled edge of the disk and in contact therewith and onto the friction-face to communicate motion from one to the other of the disk and wheel, at different speeds, and means to shift said friction-wheel laterally, substantially as described.

15. The combination with a driven member, of a drive-shaft and a drive-wheel for engagement with the driven member, said wheel being mounted slidably on the shaft and adapted for pivotal movement upon the shaft without bodily movement therefrom, to lie with its axis alternately intersecting and lying outside of the axis of the driven member, and means for holding the driving member yieldably against pivotal movement.

16. The combination with a driven friction-disk having separate mutually-adjacent friction-faces, of driving friction-wheels mutually connected for rotation simultaneously and in the same direction, and means to shift said wheels laterally to engage the disk alternately on the same face to drive it in opposite directions and at the same initial speed and to pass from one face to an adjacent face of the wheel and toward or from the center thereof without disengagement from the disk to vary the speed thereof, substantially as described.

17. The combination of a disk, a shaft at an angle to the axis thereof, one of said elements being movable toward and from the other, and a wheel shiftable on said shaft, radially of said disk, for engagement with the latter, substantially as described.

18. The combination with a driven rotatable member having separate mutually-adjacent friction-faces, of a pivoted motor having a driving member for movement into and out of operative relation to the rotatable member when the motor is moved pivotally, said driving member being mounted for movement from one face to another without disengagement from the driven member.

19. The combination with a driven friction-wheel having separate mutually-adjacent faces, of a pivoted motor and a friction-wheel carried by the motor for movement into and out of operative relation to the disk when the motor is moved pivotally, said friction-wheel being shiftable over the faces of the disk without disengagement therefrom.

20. The combination with a driven member of a drive-shaft and spaced friction-wheels mutually connected and mounted slidably upon the shaft for alternate engagement with the same face of the driven member to drive it in opposite directions, one of the wheels being adapted for pivotal movement to lie with its axis alternately intersecting and lying outside of the axis of the driven member.

21. The combination with a driven friction-disk, of a drive-shaft and spaced friction-wheels mounted upon the shaft for movement longitudinally thereof and for rotation thereby, whereby they may be alternately engaged with the same face of the disk to rotate it in opposite directions, one of the wheels being pivotally mounted for movement to lie with its axis intersecting or outside of the axis of the disk.

22. The combination with a friction-disk of a motor having a shaft, a sleeve slidably mounted upon the shaft and lying diametrically of the driven disk, and friction-wheels mounted upon the sleeve and lying at opposite sides of the center of the disk, said wheels being adapted for alternate engagement with the same face of the disk to reverse it without reversing the direction of rotation of the shaft, and one of the wheels being pivotally mounted for movement to lie with its axis intersecting or outside of the axis of the disk.

23. The combination with a driven friction member, of a drive-shaft intersecting the axis of the driven member, and a drive-wheel mounted upon the shaft for sliding movement toward and away from the center of the driven member, said wheel being pivotally mounted with respect to the drive-shaft for movement for its axis to coincide with and to lie at an angle to the axis of the shaft.

24. The combination with a driven member, of a drive-shaft and a drive-wheel mounted slidably upon the shaft for movement over the face of the driven member, said wheel being pivoted with respect to the shaft for movement of its axis to aline with or intersect the axis of the shaft.

25. The combination with a revoluble disk, of a shaft adapted for movement toward and from the disk, a sleeve revoluble with and longitudinally movable on said shaft, and a wheel mounted on said sleeve for universal axial movement, substantially as described.

26. The combination with a revoluble driven member, of a drive-shaft, a sleeve revoluble with and longitudinally movable on said drive-shaft, a member, revoluble with and axially pivoted on said sleeve, and a drive-wheel revoluble with and axially pivoted on said axially-pivoted member, the respective axes of said drive-wheel and axially-pivoted member being at right angles to each other, substantially as described.

27. The combination with a disk, of a shaft and a wheel mounted for movement, transversely across the disk, said wheel having a collar, pivotally mounted for angular movement with relation to the shaft, and said wheel being pivotally mounted on said collar for angular movement with relation thereto, the respective axes of said collar and wheel being at right angles to each other, substantially as described.

28. The combination with a disk, of a shaft and a wheel mounted for movement transversely across the disk, said wheel having a collar pivotally mounted for angular movement with relation to the shaft, and said wheel being pivotally mounted in said collar for angular movement with relation thereto, the respective axes of said collar and wheel being at right angles to each other and in the plane of the diametric center of said wheel, substantially as described.

29. The combination of a disk, a shaft, the axis of which intersects that of the disk, a wheel mounted for universal angular movement on said shaft, means to move said wheel radially with relation to said disk and means to turn said wheel to dispose its plane of revolution at any desired angle with respect to its radial path, substantially as described.

30. The combination of a disk, a shaft disposed across and movable toward and from the same and a wheel shiftable on said shaft, across said disk, said wheel being mounted for universal angular movement on said shaft, substantially as described.

31. The combination with a revoluble driven member, of spaced revoluble driving members, movable longitudinally for contact with the driven member at points on opposite sides of the center thereof, means for rotating said driving members, and means to shift them simultaneously to alternately engage them with the driven member and shift the engaged driving member over the face of the driven member, substantially as described.

32. The combination of a disk, a shaft at an angle to the axis thereof, one of said elements being movable toward and from the other, a wheel shiftable on said shaft, radially of said disk, for engagement with the latter, said wheel being mounted for universal angular movement on said shaft, substantially as described.

33. The combination of a disk, and a wheel mounted for universal angular axial movement and for radial movement on said disk, whereby said wheel may turn to dispose its plane of revolution at any desired angle with respect to its radial path without wabbling on its axis, substantially as described.

In testimony that I claim the foregoing as my own I have hereto affixed my signature in the presence of two witnesses.

HUGH PARTRIDGE.

Witnesses:
E. E. DOYLE,
FRANK S. APPLEMANN.